US012512112B2

(12) United States Patent
Camacho Perez et al.

(10) Patent No.: US 12,512,112 B2
(45) Date of Patent: Dec. 30, 2025

(54) SINGLE DEVICE FOR NOISE MITIGATION AND ENHANCEMENT OF SPEECH AND RADIO SIGNALS

(71) Applicant: Intel Corporation

(72) Inventors: Jose Rodrigo Camacho Perez, Guadalajara (MX); Eduardo Alban, Hillsboro, OR (US); Shahrnaz Azizi, Cupertino, CA (US); Hector Cordourier Maruri, Guadalajara (MX); German Fabila Garcia, Zapopan (MX); Alejandro Ibarra Von Borstel, Manchaca, TX (US); Paulo Lopez Meyer, Zapopan (MX); Julio Cesar Zamora Esquivel, West Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 638 days.

(21) Appl. No.: 17/879,174

(22) Filed: Aug. 2, 2022

(65) Prior Publication Data

US 2022/0375488 A1 Nov. 24, 2022

(51) Int. Cl.
*G10L 25/00* (2013.01)
*G10L 21/0232* (2013.01)
*G10L 25/18* (2013.01)
*G10L 25/30* (2013.01)

(52) U.S. Cl.
CPC .......... *G10L 25/18* (2013.01); *G10L 21/0232* (2013.01); *G10L 25/30* (2013.01)

(58) Field of Classification Search
CPC ................. G10L 21/02; G10L 21/0208; G10L 2021/02085; G10L 2021/02082;
(Continued)

(56) References Cited

U.S. PATENT DOCUMENTS 5,666,466 A * 9/1997 Lin ......................... G10L 17/02 704/E17.005
6,804,640 B1 * 10/2004 Weintraub ................ H04L 1/20 704/226

(Continued)

OTHER PUBLICATIONS

Z. Xu, I. Petrunin and A. Tsourdos, "Identification of Communication Signals Using Learning Approaches for Cognitive Radio Applications," in IEEE Access, vol. 8, pp. 128930-128941, 2020. (Year: 2020).*

(Continued)

*Primary Examiner* — Edgar X Guerra-Erazo
(74) *Attorney, Agent, or Firm* — Akona IP PC

(57) ABSTRACT

This disclosure describes systems, methods, and devices related to reducing noise in and improving speech signals and radio signals. A device may identify a radio frequency signal received by radio frequency circuitry at a time; apply a Short Time Fourier Transform (STFT) to the radio frequency signal to generate a STFT signal; identify a signal-to-noise ratio associated with the radio frequency signal at the time; identify a packet-error-rate associated with the radio frequency signal at the time; identify activity when the multiplexed radio frequency signal is received by the radio frequency circuitry at the time; select, based on the signal-to-noise ratio, the packet-error-rate, and the activity, a spectral mask to be applied to the STFT signal; apply the selected spectral mask to the STFT signal to generate a clean STFT signal; and apply an inverse STFT to the clean STFT signal to generate a clean radio frequency signal.

20 Claims, 7 Drawing Sheets

(58) Field of Classification Search
CPC ....... G10L 2021/02087; G10L 21/0216; G10L 2021/02161; G10L 2021/02163; G10L 2021/02165; G10L 2021/02166; G10L 2021/02168; G10L 21/0224; G10L 21/0232; G10L 21/0272; G10L 21/028; G10L 21/0364; G10L 21/038; G10L 21/0388; G10L 21/057; G10L 25/00; G10L 25/03; G10L 25/18; G10L 25/21; G10L 25/30; G10L 25/27; G10L 25/72; G10L 25/60; G10L 2025/786; G10L 2025/783; G10L 25/84; G10L 25/87; G10L 2025/932; G10L 2025/937
See application file for complete search history.

(56) References Cited

U.S. PATENT DOCUMENTS

| | | | | |
|---|---|---|---|---|
| 7,120,580 | B2 * | 10/2006 | Rao Gadde | G10L 15/20 704/255 |
| 7,277,550 | B1 * | 10/2007 | Avendano | H03G 7/007 704/226 |
| 10,923,137 | B2 * | 2/2021 | Hasan al Banna | G10L 25/84 |
| 11,062,723 | B2 * | 7/2021 | Jensen | G10L 25/18 |
| 2016/0111107 | A1 * | 4/2016 | Erdogan | G10L 25/03 704/226 |
| 2019/0341067 | A1 * | 11/2019 | Rajendran | G10L 25/30 |
| 2021/0082450 | A1 * | 3/2021 | Jensen | G10L 21/0232 |
| 2022/0225023 | A1 | 7/2022 | Maruri et al. | |

OTHER PUBLICATIONS

J. Jensen and C. H. Taal, "An Algorithm for Predicting the Intelligibility of Speech Masked by Modulated Noise Maskers," in IEEE/ACM Transactions on Audio, Speech, and Language Processing, vol. 24, No. 11, pp. 2009-2022, Nov. 2016 (Year: 2016).*

Al-Baidani et al., European Application No. 21198760.7, filed Sep. 24, 2021, 44 pages.

Wang et al., "On Training Targets for Supervised Speech Separation," IEEE/ACM Transactions on Audio, Speech, and Language Processing, vol. 22, No. 12, Dec. 2014, 10 pages.

* cited by examiner

SINGLE DEVICE FOR NOISE MITIGATION AND ENHANCEMENT OF SPEECH AND RADIO SIGNALS

TECHNICAL FIELD

This disclosure generally relates to devices, systems, and methods for signal processing and, more particularly, to using a single device to enhance and mitigate noise for both speech and radio signals.

BACKGROUND

Noise and interference are common problems for radio and speech systems. Solutions to reduce noise and interference for radio and speech signals often increase hardware footprint and computational cost.

DETAILED DESCRIPTION

Figure 1:
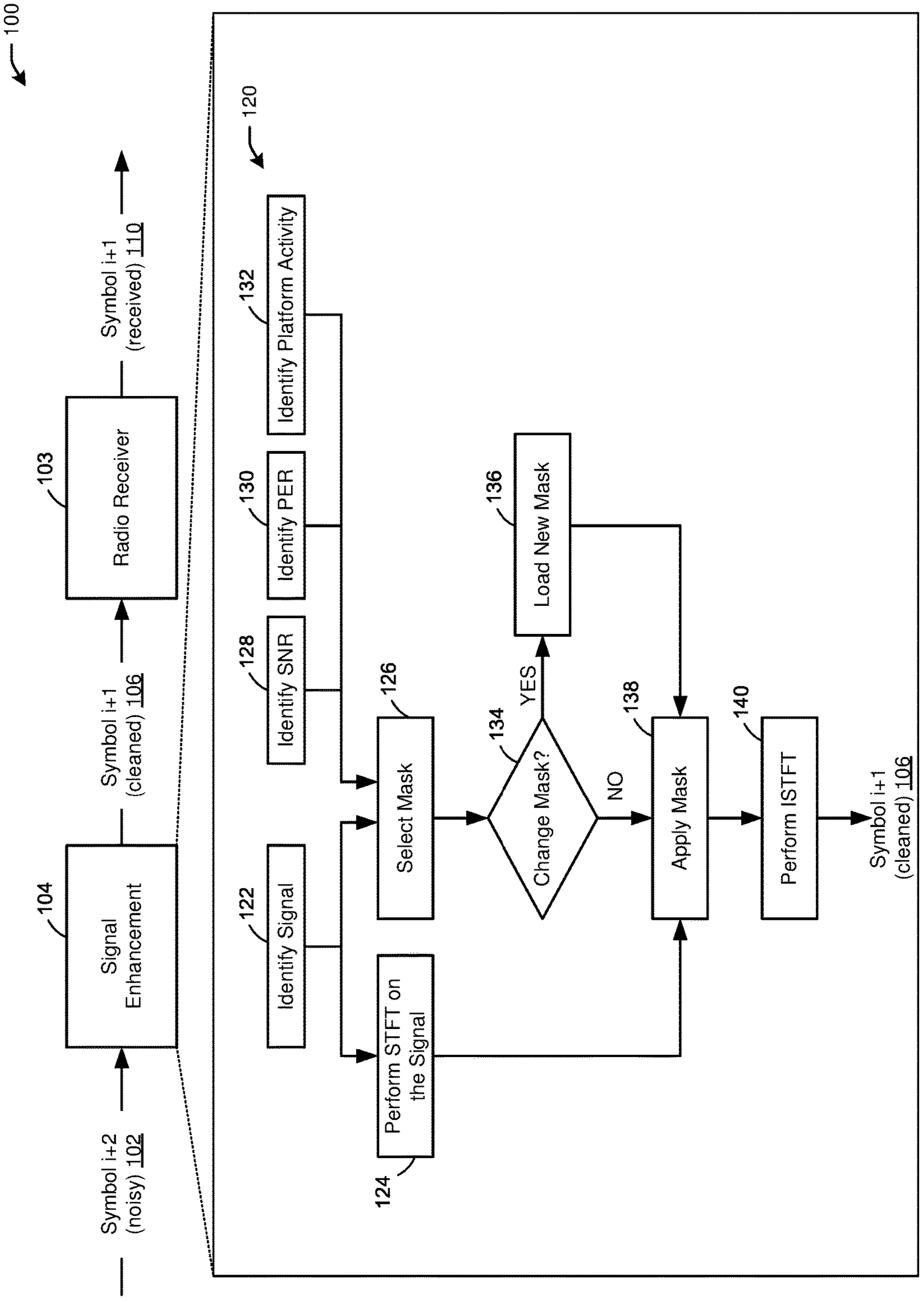
FIG. 1 is an example process for using a single device to enhance and mitigate noise for both speech and radio signals, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In radio systems, electromagnetic noise at the receiver reduces the received signal-to-noise ratio (SNR) and degrades the receiver performance, causing connection loss or reduced data-rates for end users. In speech recognition, acoustic noise causes lower performance (e.g., higher word error rate). In both cases, the end-user experience may be impacted. For example, unintended electromagnetic radiation arising from the platform itself (e.g., self-interference) may cause product release delays. Also, better performing speech recognition in certain noisy environments may provide a competitive advantage. In the case of speech, other applications like emulating high-quality microphones can be treated with a technique analogous to noise cancellation, and therefore can be processed based on the present disclosure.

Traditional solutions for eliminating noise include the use of absorbers to a device, which may be costly and may require significant trial and error to implement. Some noise reduction and signal enhancement solutions exist for both speech and radio signal domains and may be implemented separately for either speech signals or radio signals, but not both. Existing solutions increase the hardware footprint, power consumption, and cost. Moreover, some techniques are based on machine learning, which may require increased computational cost. Per-packet noise estimation and whitening algorithms may require additional hardware, and may lack intelligence regarding the source and timing of noise, undermining per-packet noise estimation.

Radio signals and speech signals are different in nature (e.g., a speech signal herein does not refer to a radio signal whose payload includes speech/voice data, but rather refers to a voice signal captured by a microphone). In particular, radio signals are multiplexed in the frequency domain. Modern radio systems (e.g. Wi-Fi defined by the 802.11 technical standards) may use Orthogonal Frequency Division Multiplexing (OFDM). This means that the radio signal data is transformed into multiple orthogonal signals (with overlapping spectra), and then each signal is transmitted at different carrier frequencies. The present disclosure applies to radio signals at the baseband, before removing this type of multiplexing. In addition, radio signals are complex valued (e.g., modulated), and pseudo-randomly time sequenced. Orthogonal radio signals are modulated in amplitude and phase, and therefore are represented in the complex domain, whereas audio signals are represented in the real domain (e.g., before Fourier transformations). The information in radio signals is digitally coded into pseudo-random sequences prior to modulation and multiplexing.

Therefore, existing solutions that select and apply a mask to speech signals may not apply to complex-valued, multiplexed, pseudo-random radio signals, and an enhanced noise mitigation and signal enhancement technique is desirable for both speech and radio signals. The absence of a unified solution (e.g., a single device that cancels noise for both radio and speech signals) increases footprint, power consumption, production costs, and computing requirements because separate radio and speech systems each may implement their own noise cancellation (or speech enhancement).

In one or more embodiments, a unified device may cancel noise in both the speech signal domain and the radio signal domain without performance tradeoffs. The noise cancellation may occur at the baseband part of Wi-Fi hardware/silicon. The present disclosure defines a method and apparatus for unified speech and radio noise mitigation and signal enhancement by extending the use of Short Time Fourier Transform (STFT) masks (previously available only for speech applications) to radio signals. Samples of noise that impacts the speech device, and noise that impacts the radio device (e.g., Wi-Fi) may be collected, analyzed, characterized, and used for training of algorithms prior to production. During the run time, the engine that runs on the platform and/or that is implemented as a hardware accelerator, provided in the present disclosure, predicts the suitable spectral speech or radio masks associated with the real-time speech or radio noise, and enables the application of the corresponding speech or radio mask to the STFT of the input speech or radio signal. To mitigate the noise, the inverse STFT of the processed speech or radio signal is performed, followed by the remainder of the receiver's procedures. In some embodiments, instead of speech noise reduction, the present disclosure may be used for enhancing the quality of the speech signal, emulating a higher quality microphone. A single device that performs noise cancellation for both radio-frequency (RF) and speech signals would reduce the footprint and cost because the same hardware can be reused for multiple purposes without performance tradeoffs (compared to using separate modules for radio and speech signals). In this manner, speech signals and radio signals may be physically connected to a same, single device.

In one or more embodiments, the noise cancelation device may use spectral masks. Spectral masks may be extended for application to radio signals. A spectral mask is a ratio of signal and noise in the Short-Time Fourier Transform (STFT) domain. The elementwise (e.g., Hadamard) product of such masks and the STFT of the input speech or radio signals results in enhanced versions of the signals. The STFT operation is agnostic to the kind of signal (e.g., radio versus speech) enables a unified hardware reuse.

In one or more embodiments, to minimize latency, the present disclosure considers the method of processing information chunk-by-chunk, taking advantage of wireless protocols. The present disclosure can include demodulation of a chunk at the receiver while the next chunk is being cleaned with the mask. SNR can be considered while learning the masks. Then, for each mask, a range of valid SNRs can be defined. Wireless systems provide the advantage of packet error rate (PER) estimations. PER can be monitored to avoid potential, unexpected impacts to PER.

In one or more embodiments, to generate the masks, the device may receive a noise dataset and clean signals datasets for both radio signals and speech signals (e.g., separate datasets for speech signals and noise, and for radio signals and noise). The device may select the i-th noise packet (e.g., randomly) and the i-th clean signal packet (e.g., randomly). From the i-th clean signal packet, the device may determine the signal $s_i(t)$, and may perform the STFT on $s_i(t)$ to generate $s_i(f,t)$. From the i-th noise packet, the device may generate the noise signal $n_i(t)$, which may be added to $s_i(t)$ to generate $g_i(t)$ on which the device may perform STFT to generate $G_i(f,t)$. The device may determine a ratio of $G_i(f,t)/s_i(f,t)$, resulting in the spectral STFT mask $m_i(f,t)$. The device may use a loop to generate multiple masks using the i-th packets, with counter i being updated until i is greater than a threshold number N. The device may determine the average of the masks for the different types of signals (e.g., an average radio signal mask, an average speech signal mask), resulting in a mask M(f,t) for the respective radio signals or speech signals. The device may store the mask M(f,t) for respective noise and SNR cases, and may map the masks and SNR to define the SNR range of signals for which a given mask may apply: M(f,t,snr). The masks may be stored in a database for a noise type (e.g., a type of computer platform activity) and the SNR range.

In one or more embodiments, to generate clean signals or enhanced signals using the spectral masks, the device may receive a signal (e.g., speech or radio), and may determine the SNR, PER, and computer platform activity (e.g., what application or process is running, whether the CPU is idle, etc.) associated with the signal. The type and amount of noise may be based on what is running on the computer. The device may determine the noise from the signal $g_{noisy}(t)$ and may perform STFT on the signal to generate $G_{noisy}(f,t)$. The device may select a mask based on the type of signal (e.g., radio or speech), SNR, PER, and platform activity. If the SNR or PER changes, the device may load a new mask to apply. The device may apply the selected mask M(f,t) to $G_{noisy}(f,t)$ to generate a clean or enhanced signal $G_{clean}(f,t)$ based on Equation (2): $G_{clean}(f,t)=G_{noisy}*M$ (2), where "*" is an elementwise (e.g., Hadamard) product. The resulting clean or enhanced signal may be $g_{clean}(t)$.

In one or more embodiments, radio circuitry may receive radio signals. A hardware accelerator may select and apply the mask to the radio signals prior to removing the multiplexing of the radio signals. The hardware accelerator may include a radio data pipeline manager (e.g., to reduce latency), a PER and SNR tracker, a mask selector, a noise classifier (e.g., a neural network for analyzing signals for mask selection), mask storage to store previously trained masks, STFT modules and ISTFT modules (e.g., for performing the forward and inverse STFTs), a Hadamard product engine (e.g., for performing the element-wise product between mask and signal), configuration registers (e.g., enabling the configuration of a device for speech or radio signals), audio and radio modules for receiving and digitizing radio or speech signals, and a CPU. To minimize process latency, the radio data pipeline manager may process signals chunk by chunk, and a chunk may be demodulated at a receiver while a subsequent chunk is being cleaned with the mask. For example, Wi-Fi signals according to the IEEE 802.11 standards may begin with a legacy preamble, followed by additional OFDM symbols. As time samples of a Wi-Fi signal arrive at a radio, filters may be applied chunk by chunk (e.g., STFT size or samples worth one OFDM symbol duration), then the symbol may be passed to the radio for Wi-Fi receiver operation.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an example process 100 for using a single device to enhance and mitigate noise for both speech and radio signals, according to some example embodiments of the present disclosure.

Referring to FIG. 1, the process 100 may include receiving an i+2-ith symbol 102 with noise, which may be a symbol of a radio signal. Prior to the received i+2-th symbol 102 being sent to a radio receiver 103 (e.g., a radio frequency receiver, such as an 802.11 Wi-Fi receiver), the i+2-th symbol 102 may undergo a signal enhancement 104, which may result in generation of an i+1-th symbol 106 that has been cleaned by the signal enhancement 104. The cleaned i+1-th symbol 106 may be sent to the radio receiver 103 for further processing, which may result in a received i+1-th symbol 110. The signal enhancement 104 may apply to both radio signals and speech signals, and may include identifying the signal at step 122, performing a STFT on the signal at step 124 (e.g., to generate a STFT signal in the STFT domain), and selecting a spectral mask to which to apply to the signal at step 126. To select a spectral mask, the signal enhancement 104 may include identifying SNR of the signal at step 128, identifying PER of the signal at step 130, and identifying platform activity at step 132 (e.g., platform activity may map to a classified type of noise based on training of a machine learning model that includes inputting noise types associated with known platform activities).

Still referring to FIG. 1, the process 100 may include determining, at step 134, whether to change a selected spectral mask (e.g., based on whether the SNR or PER has changed for the signal). If so, a new spectral mask may be selected at step 136. The selected spectral mask may be applied to the STFT signal at step 138, and an iSTFT may be performed on the masked signal at step 138 to generate the cleaned i+1-ith symbol 106.

In one or more embodiments, the process 100 may include determining the noise from the signal $g_{noisy}(t)$, and performing STFT on the signal to generate $G_{noisy}(f,t)$ at step 124. The process 100 may include selecting a mask at step 126 based on the type of signal (e.g., radio or speech), SNR, PER, and platform activity. If the SNR or PER changes, the device may load a new mask to apply at step 136. Step 138 may apply the selected mask M(f,t) to $G_{noisy}(f,t)$ to generate a clean or enhanced signal $G_{clean}(f,t)$ based on Equation (2) above. The iSTFT at step 140 may generate the cleaned i+1-ith symbol 106, which may be represented as $g_{clean}(t)$ Currently, there are no known techniques for using a single device to perform the signal enhancement 104 to both speech and radio signals, and to consider SNR, PER, and platform activity when selecting a spectral mask at step 126.

Figure 2:
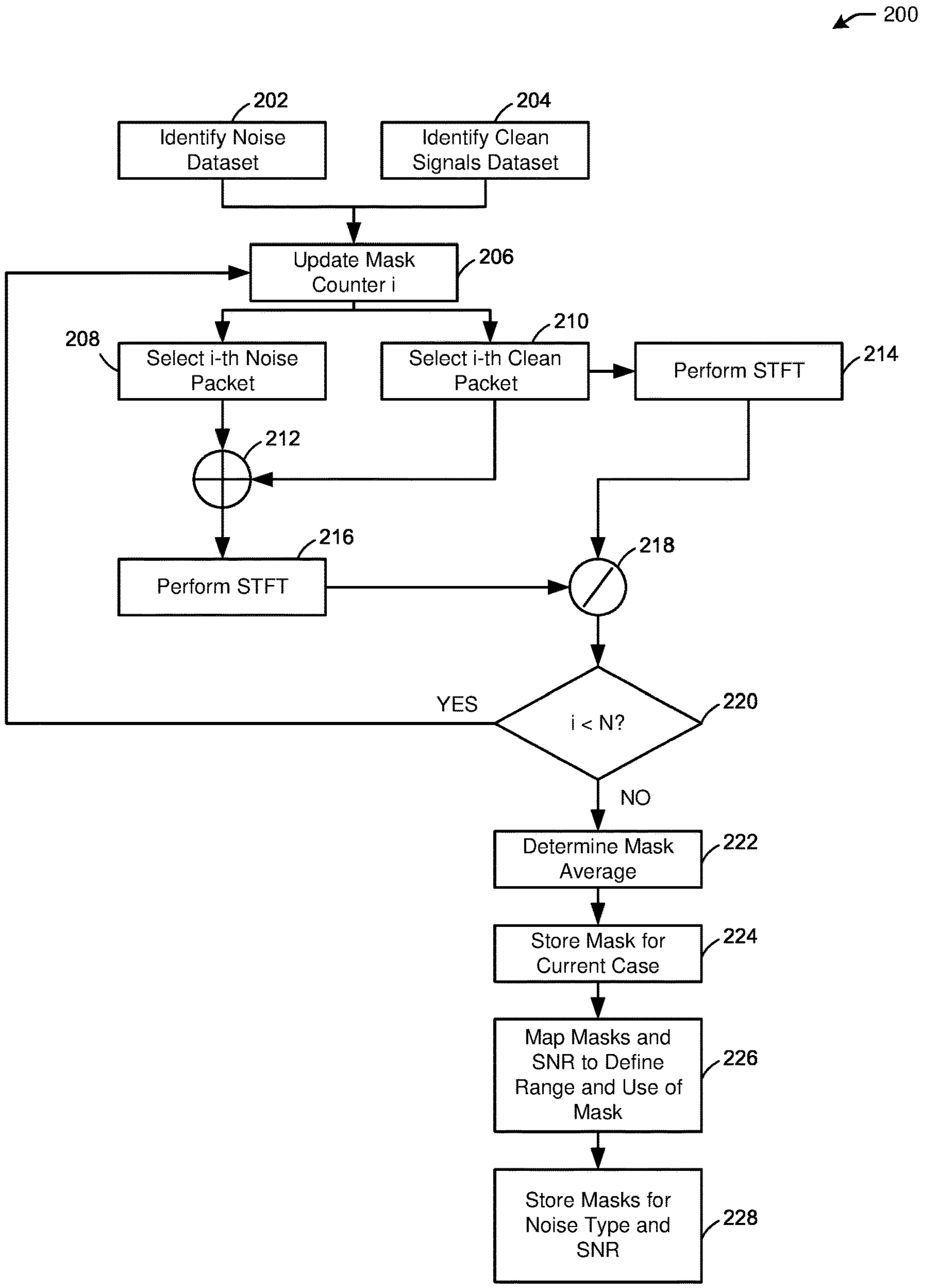
FIG. 2 illustrates example process for generating spectral masks for a single device to use to enhance and mitigate noise for both speech and radio signals, according to some example embodiments of the present disclosure.

FIG. 2 illustrates example process 200 for generating spectral masks for a single device to use to enhance and mitigate noise for both speech and radio signals, according to some example embodiments of the present disclosure. The process 200 generates spectral masks from which the process 100 of FIG. 1 may select (e.g., at step 126) a spectral mask from among multiple available spectral masks.

Referring to FIG. 2, the process 200 may include identifying a noise dataset at step 202, and identifying a clean signals dataset at step 204. The clean signals dataset may include signals without noise. The noise dataset may include mappings of noise types to platform activity, as determined by training a machine learning model (e.g., the noise prediction engine 314 of FIG. 3A) with known noise types associated with known computer activities to predict a noise type based on the computer activity identified as performed when a signal is received. At step 206, the process 200 may update a mask counter i (e.g., corresponding to the value i used in FIG. 1). At step 208, the process 200 may include selecting an i-th noise packet from the noise dataset. At step 210, the process may include selecting an i-th clean signal packet from the clean signals dataset. The selections at steps 208 and 210 may be made randomly. From the i-th clean signal packet, step 210 may include determining the signal $s_i(t)$, and step 214 of the process 200 may include performing STFT on $s_i(t)$ to generate $s_i(f,t)$.

Still referring to FIG. 2, from the i-th noise packet, step 208 may include generating the noise signal $n_i(t)$, which at step 212 may be added to $s_i(t)$ to generate $g_i(t)$ on which the process 200 may include performing, at step 216, STFT to generate $G_i(f,t)$. At step 218, the process 200 may include determining a ratio of $G_i(f,t)/s_i(f,t)$, resulting in the spectral STFT mask $m_i(f,t)$. The device may use a loop to generate multiple masks using the i-th packets, with counter i being updated until i is greater than a threshold number N. For example, at step 220, the process 200 may include determining whether $i<N$. If so, the loop may continue to step 206. When i is no longer less than N, at step 222 the process 200 may include determining the average of the masks for the different types of signals (e.g., an average radio signal mask, an average speech signal mask), resulting in a mask M(f,t) for the respective radio signals or speech signals. At step 224, the process may include storing the mask M(f,t) for respective noise and SNR cases, and at step 226 may include mapping the masks and SNR to define the SNR range of signals for which a given mask may apply: M(f,t,snr). The masks may be stored, at step 228, in a database for a noise type (e.g., a type of computer platform activity) and the SNR range.

In one or more embodiments, determining the mask average at step 222 may be replaced with other implementations. For example, a neural network may be trained with the masks obtained from step 220 to generate a mask. In other examples, the neural network would receive a signal as an input and then deliver a mask as the output. In this case, step 222 may represent the training of the neural network, while steps 224-228 would refer to storing the neural network instead of the average mask. Moreover, the neural network may be trained to take the current case and SNR as inputs. Therefore, the mask predicted by the neural network may account for the case and SNR as described in steps 224-228

Referring to FIGS. 1 and 2, a single device may perform the process 100 and the process 200 for both speech signals and radio signals. For example, device 301 of FIG. 3A may include the hardware accelerator 312 of FIG. 3A (e.g., represented by the signal enhancing device 619 of FIG. 6) capable of performing the steps of the process 100 and the process 200.

Figure 3A:
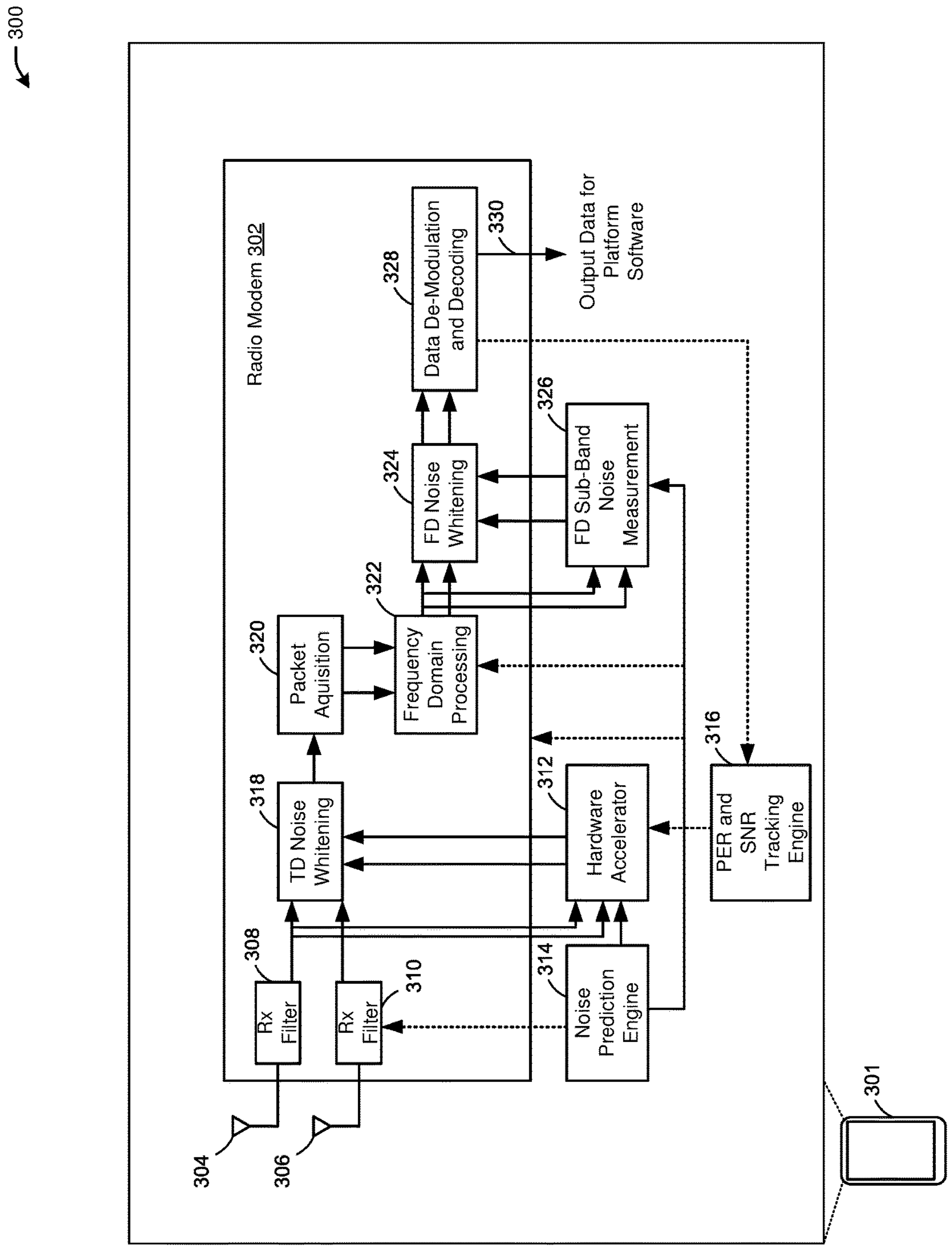
FIG. 3A is an example schematic of components for a single device to use to enhance and mitigate noise for both speech and radio signals, according to some example embodiments of the present disclosure.

FIG. 3A is an example schematic of components 300 for a single device to use to enhance and mitigate noise for both speech and radio signals, according to some example embodiments of the present disclosure.

Referring to FIG. 3, a device 301 (e.g., capable of performing the process 100 of FIG. 1 and the process 200 of FIG. 2) may include a radio modem 302 (e.g., an 802.11 Wi-Fi modem or other wireless modem) for receiving radio frequency signals. Radio frequency signals may be multiplexed and received by antennae 304 and 306 of the radio modem 302. The received multiplexed radio frequency signals may be sent to receiver (RX) filters 308 and 310. The filtered multiplexed radio frequency signals may be sent to a hardware accelerator 312, capable of representing the signal enhancement 104 of FIG. 1 and performing the process 100 and the process 200. To select and apply a spectral mask to apply to the filtered multiplexed radio frequency signals, the hardware accelerator may rely on a noise classification generated by a noise prediction engine 314 (e.g., a neural network trained with known noises and associated known platform activities). Based on the platform activities of the device 301, the noise prediction engine 314 may map the platform activities to a noise classification that may be provided to the hardware accelerator 312. The hardware accelerator 312 may consider the noise classification (e.g., and associated platform activity mapping to the noise), the PER at the time a multiplexed radiofrequency signal is received, and the SNR at the time a radiofrequency signal is received, to select a spectral mask to apply to the filtered multiplexed radio frequency signals. The PER and SNR may be provided by a PER and SNR tracking engine 316.

Still referring to FIG. 3, once the hardware accelerator 312 has generated $g_{clean}(t)$ by applying the selected spectral mask and performing iSTFT on the cleaned/enhanced signal, the hardware accelerator 312 may provide $g_{clean}(t)$ to the radio modem 302 for further processing prior to de-multiplexing the multiplexed radio frequency signal. Further processing by the radio modem 302 may include, for example, time-domain noise whitening 318 (e.g., equalizing a signal spectrum to make it similar to a white noise spectrum in the time domain), packet acquisition 320, frequency domain processing 322, frequency domain noise whitening 324 (e.g., equalizing a signal spectrum to make it similar to a white noise spectrum in the frequency domain), frequency domain sub-band noise measurements 326, and data de-modulation and decoding 328 (e.g., including de-multiplexing), resulting in output data 330 for platform software of the device 301. The PER and SNR tracking engine 316 may track PER and SNR from the data de-modulation and decoding 328.

Figure 3B:
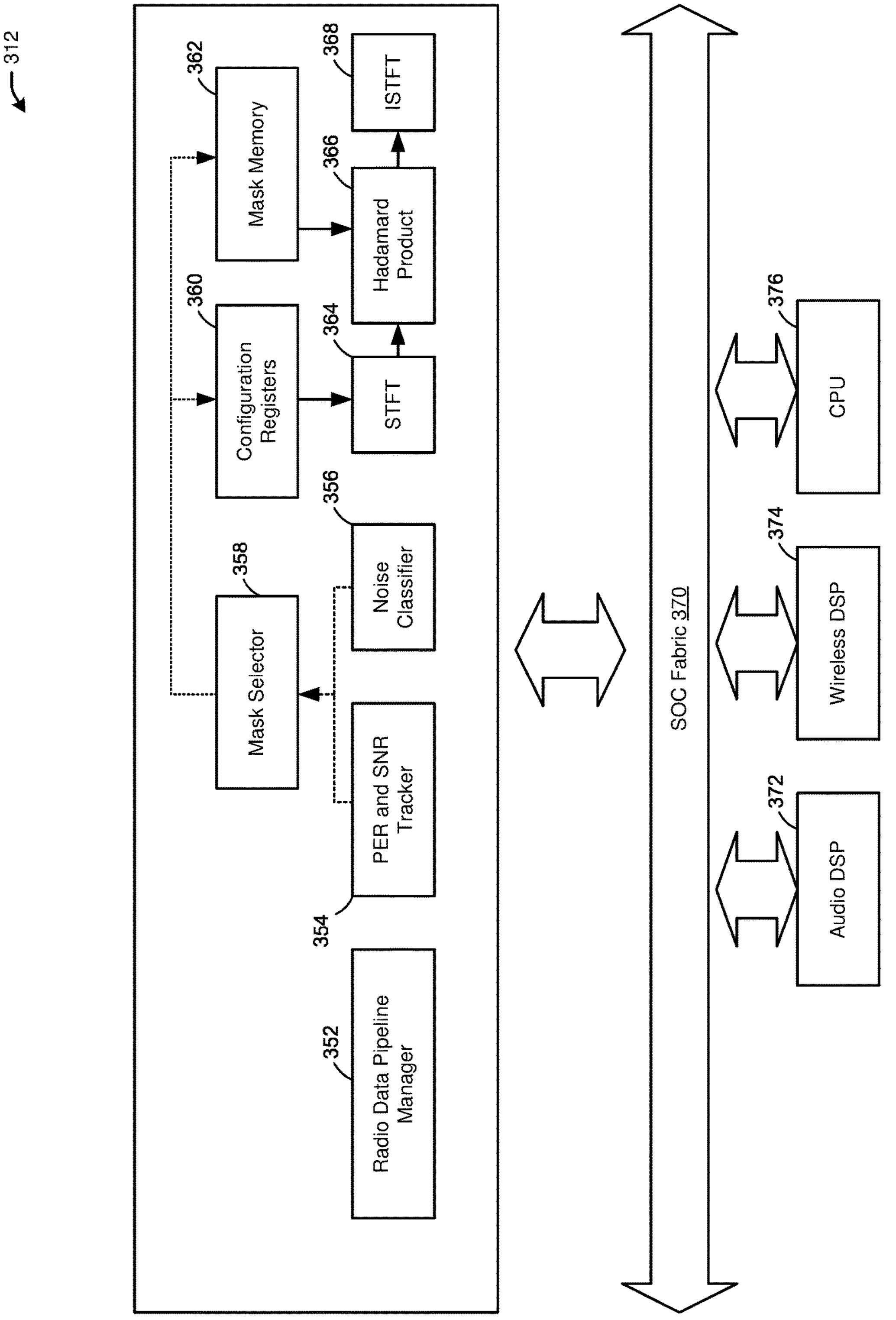
FIG. 3B is an example schematic of the hardware accelerator of FIG. 3A to use to enhance and mitigate noise for both speech and radio signals, according to some example embodiments of the present disclosure.

FIG. 3B is an example schematic of the hardware accelerator 312 of FIG. 3A to use to enhance and mitigate noise for both speech and radio signals, according to some example embodiments of the present disclosure.

Referring to FIG. 3B, the hardware accelerator 312 may include a radio data manager pipeline manager 352 for ensuring minimal latency by processing signals chunk by chunk, allowing a chunk may be demodulated at the radio modem 302 of FIG. 3A while a subsequent chunk is being cleaned with the mask. The hardware accelerator 312 may include a PER and SNR tracker 354 (e.g., corresponding to the PER and SNR tracking engine 316 of FIG. 3A), a noise classifier 356 (e.g., corresponding to the noise prediction engine 314 of FIG. 3A), a spectral mask selector 358, configuration registers 360, mask memory 362 for storing spectral masks and their associated SNR and PER ranges and noise types, a STFT engine 364 for applying STFT to signals, a Hadamard product engine 366 for applying a Hadamard product (e.g., Equation (2) above), and an iSTFT engine 368 for applying the inverse STFT to a masked signal. The hardware accelerator 312 may be integrated with software-on-chip (SOC) fabric 370, an audio digital signal processor (DSP) 372 (e.g., for receiving speech signals), a wireless DSP 374 (e.g., for receiving radio frequency signals), and a CPU 376 (e.g., of the device 301 of FIG. 3A) for determining platform activities performed or not performed when speech and wireless signals are received.

Figures 4A, 4B:
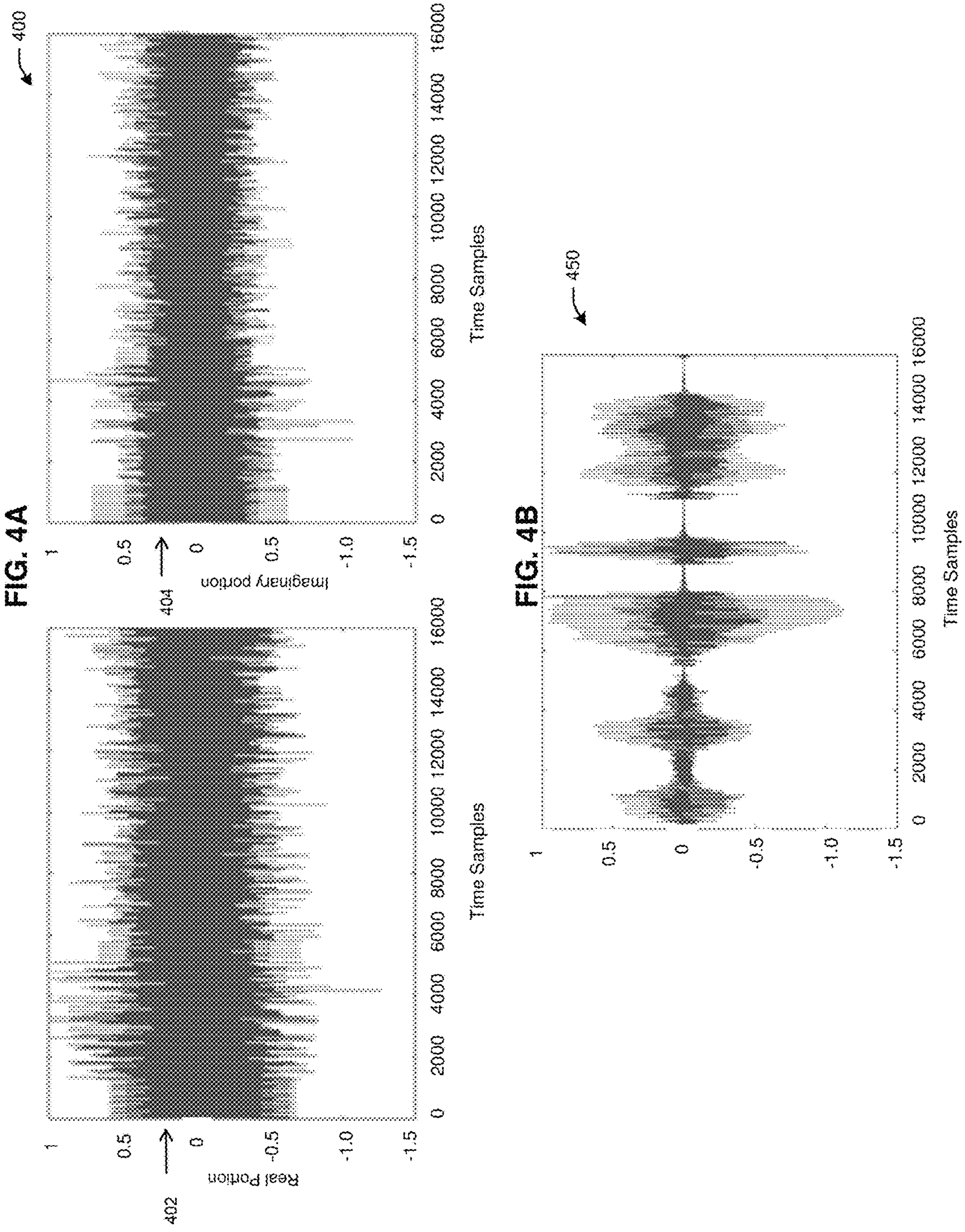
FIG. 4A shows example graphs of the real and imaginary portions of a radio signal, according to some example embodiments of the present disclosure.
FIG. 4B shows an example graph of a speech signal, according to some example embodiments of the present disclosure.

FIG. 4A shows example graphs 400 of the real and imaginary portions of a radio signal, according to some example embodiments of the present disclosure.

Referring to FIG. 4A, the graphs 400 show an example real portion 402 of a radio signal and an example imaginary portion 404 of the radio signal.

FIG. 4B shows an example graph 450 of a speech signal, according to some example embodiments of the present disclosure.

Referring to FIGS. 4A and 4B, it is shown that radio (or radio frequency) signals as referred to herein include signals with real and imaginary portions, often multiplexed when transmitted. In contrast, speech signals lack an imaginary portion and may not be multiplexed (e.g., because they are not packaged and transmitted, but rather represent voice utterances detected by a microphone).

Figure 5:
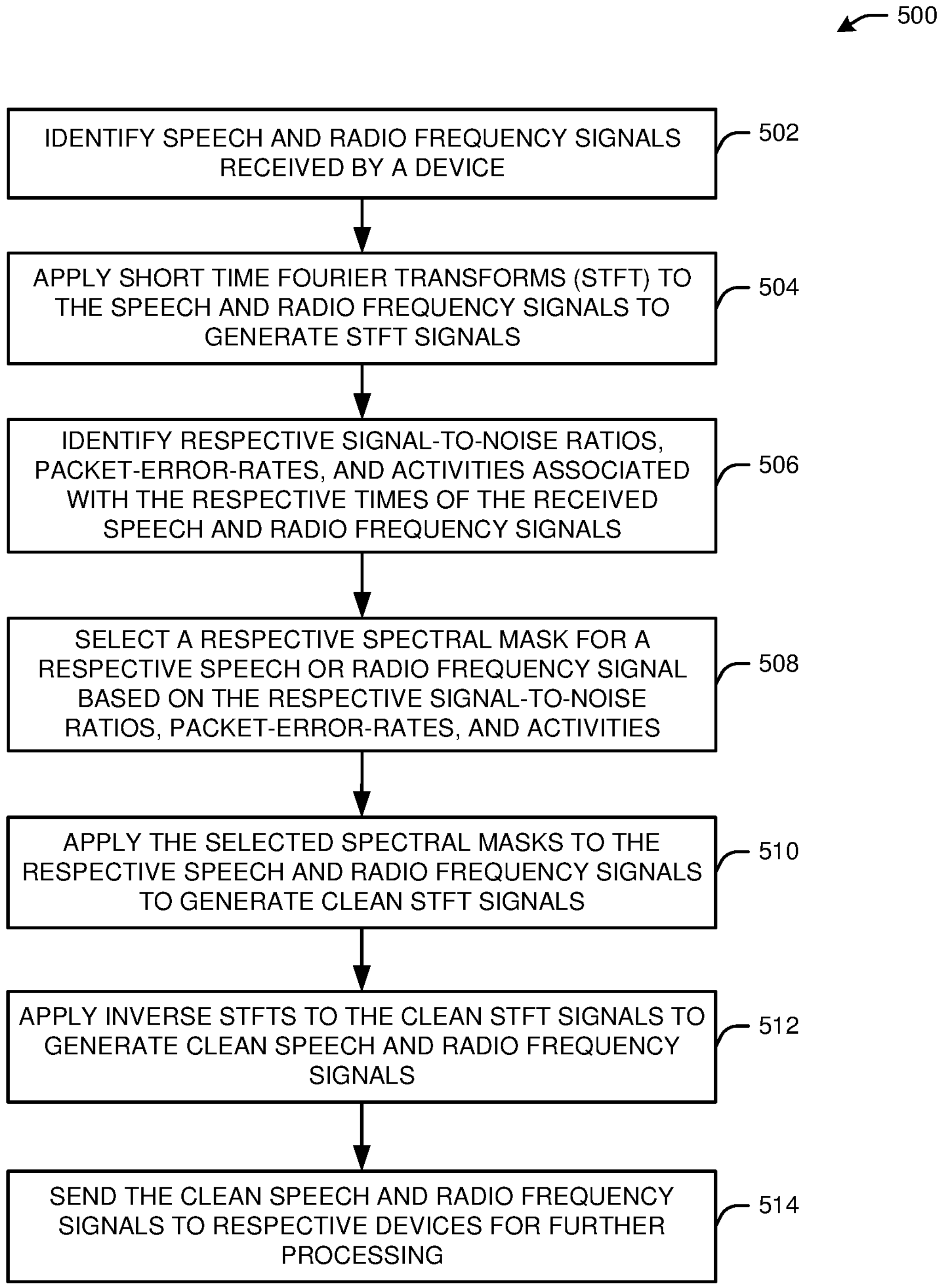
FIG. 5 illustrates a flow diagram of an illustrative process for using a single device to enhance and mitigate noise for both speech and radio signals, in accordance with one or more example embodiments of the present disclosure.

FIG. 5 illustrates a flow diagram of an illustrative process 500 for using a single device to enhance and mitigate noise for both speech and radio signals, in accordance with one or more example embodiments of the present disclosure.

Referring to FIG. 5, the process 500 may represent at least some portions of the process 100 of FIG. 1 and the process 200 of FIG. 2.

At block 502, a device (e.g., the hardware accelerator 312 of FIG. 3A, the signal enhancing device 619 of FIG. 6) may identify speech signals and radio frequency signals received by a device (e.g., the device 301 of FIG. 3A). Speech signals may be received by a microphone (e.g., one of the audio input/output devices 690 of FIG. 6). Radio frequency signals may be received by radio frequency hardware (e.g., the radio modem 302 of FIG. 3A, one of the communication devices 686 of FIG. 6). The radio frequency signals, as received, may be multiplexed, and the device may receive them prior to the signals being de-multiplexed.

At block 504, the device may apply a respective STFT to a respective speech or radio frequency signal to generate a respective STFT signal in the STFT domain. The device may determine the noise from the signal $g_{noisy}(t)$, and may perform STFT on the signal to generate $G_{noisy}(f,t)$.

At block 506, the device may identify a respective SNR, PER (e.g., for the radio frequency signals), and activities performed (e.g., by the platform device on which the device operates) at the time when a particular speech or radio frequency signal was received. The SNR, PER (e.g., for radio frequency signals), and activities performed may be used in the selection of a spectral mask to apply to a given signal. The activities may map to a noise classification so that the device may determine, based on an activity of a CPU/platform at the time when a signal was received, the type of noise associated with the signal (e.g., noise from hardware, background noise, signal interference, etc.).

At block 508, the device may select a spectral mask to apply to a speech or radio frequency signal based on whether the signal is a speech or radio frequency signal, based on the SNR, based on the PER (e.g., for radio frequency signals), and/or based on the activity at the time the signal was received. For example, the process 200 of FIG. 2 determines which masks apply to a signal for given SNR ranges, PER profiles (e.g., for radio frequency signals), and activities. The spectral masks and their mappings may be stored so that the device may select a mask based on which SNR range a signal falls within, which PER profile applies to a radio frequency signal, and which CPU/platform activity occurred when a signal was received. The masks may be generated by the process 200 for speech signals and for radio frequency signals. In this manner, for a radio frequency signal, the device may select a spectral mask from among spectral masks generated for radio frequency signals using the process 200. For a speech signal, the device may select a spectral mask from among spectral masks generated for speech signals using the process 200. The device may determine the average of the masks for the different types of signals (e.g., an average radio signal mask, an average speech signal mask), resulting in a mask M(f,t) for the respective radio signals or speech signals. The device may store the mask M(f,t) for respective noise and SNR cases, and may map the masks and SNR to define the SNR range of signals for which a given mask may apply: M(f,t,snr). The masks may be stored in a database for a noise type (e.g., a type of computer platform activity) and the SNR range.

At block 510, the device may apply the selected spectral mask to a given radio frequency or speech signal. The device may apply the selected mask M(f,t) to $G_{noisy}(f,t)$ to generate a clean or enhanced signal $G_{clean}(f,t)$ based on Equation (2) above, using a Hadamard (e.g., element-wise product between mask and signal).

At block 512, the device may apply an iSTFT to the clean or enhanced signal $G_{clean}(f,t)$ to generate $g_{clean}(t)$, representing the clean or enhanced signal in the time domain.

At block 514, the device may send the clean or enhanced signal $g_{clean}(t)$ to another device for further processing. For example, when the signal is a multiplexed radio frequency signal, the device may send the clean or enhanced radio frequency signal to the radio modem 302 of FIG. 3A for further processing (e.g., including de-multiplexing of the signal). When the signal is a speech signal, further processing may be performed (e.g., using the processor 610 or 630 of FIG. 6) on the clean or enhanced audio.

It is understood that the above descriptions are for purposes of illustration and are not meant to be limiting.

Figure 6:
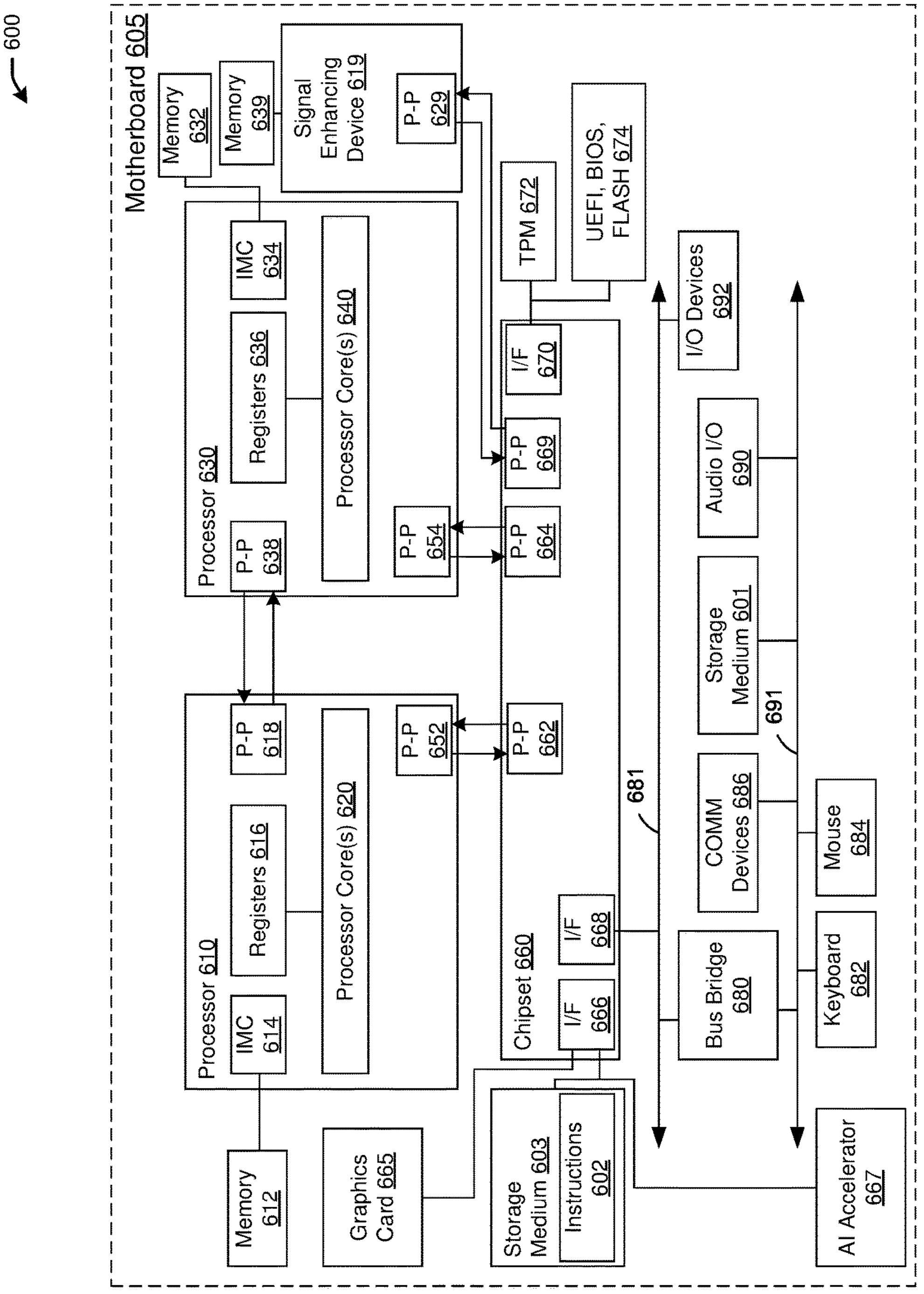
FIG. 6 illustrates an embodiment of an exemplary system, in accordance with one or more example embodiments of the present disclosure.

FIG. 6 illustrates an embodiment of an exemplary system 600, in accordance with one or more example embodiments of the present disclosure.

In various embodiments, the computing system 600 may comprise or be implemented as part of an electronic device.

In some embodiments, the computing system 600 may be representative, for example, of a computer system that implements one or more components and/or performs steps of the processes of FIGS. 1-3B and 5.

The embodiments are not limited in this context. More generally, the computing system 600 is configured to implement all logic, systems, processes, logic flows, methods, equations, apparatuses, and functionality described herein and with reference to FIGS. 1-3B and 5.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIGS. 3A and 3B. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point interconnect platform that includes a processor 610, a processor 630 coupled via a point-to-point interconnects as an Ultra Path Interconnect (UPI), and a signal enhancing device 619 (e.g., capable of performing the functions of FIGS. 1-3B and 5). In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614 and point-to-point (P-P) interfaces 618 and 652. Similarly, the processor 630 includes an IMC 634 and P-P interfaces 638 and 654. The WIC's 614 and 634 couple the processors 610 and 630, respectively, to respective memories, a memory 612 and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include the signal enhancing device 619. The signal enhancing device 619 may be connected to chipset 660 by means of P-P interfaces 629 and 669. The signal enhancing device 619 may also be connected to a memory 639. In some embodiments, the signal enhancing device 619 may be connected to at least one of the processors 610 and 630. In other embodiments, the memories 612, 632, and 639 may couple with the processor 610 and 630, and the signal enhancing device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the signal enhancing device 619 may access the storage medium 603 through chipset 660.

Storage medium 603 may comprise any non-transitory computer-readable storage medium or machine-readable storage medium, such as an optical, magnetic or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 500 of FIG. 5). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interfaces 652 and 662 and the processor 630 couples to a chipset 660 via P-P interfaces 654 and 664. Direct Media Interfaces (DMIs) may couple the P-P interfaces 652 and 662 and the P-P interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 which couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690 (e.g., including one or more microphones).

The artificial intelligence (AI) accelerator 667 may be circuitry arranged to perform computations related to AI. The AI accelerator 667 may be connected to storage medium 603 and chipset 660. The AI accelerator 667 may deliver the processing power and energy efficiency needed to enable abundant-data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be an apparatus for reducing noise in and improving speech signals and radio signals, the apparatus comprising processing circuitry coupled to memory, the processing circuitry configured to: identify a multiplexed radio frequency signal received by radio frequency circuitry of a device comprising the apparatus at a time; apply a Short Time Fourier Transform (STFT) to the multiplexed radio frequency signal to generate a STFT signal in a STFT domain; identify a signal-to-noise ratio associated with the multiplexed radio frequency signal at the time; identify a packet-error-rate associated with the multiplexed radio frequency signal at the time; identify activity associated with the device when the multiplexed radio frequency signal is received by the radio frequency circuitry at the time; select, based on the signal-to-noise ratio, the packet-error-rate, and the activity, a spectral mask to be applied to the STFT signal, wherein the selected spectral mask is indicative of a ratio of radio frequency signals and noise in the STFT domain; apply the selected spectral mask to the STFT signal to generate a clean STFT signal; apply an inverse STFT to the clean STFT signal to generate a clean radio frequency signal; and send the clean radio frequency signal to the radio frequency circuitry prior to the multiplexed radio frequency signal being de-multiplexed by the radio frequency circuitry.

Example 2 may include the apparatus of example 1 and/or some other example herein, wherein the processing circuitry is further configured to: identify a speech signal received by a microphone of the device at a second time; apply a second STFT to the speech signal to generate a second STFT signal in the STFT domain; identify a second signal-to-noise ratio associated with the speech signal at the second time; identify second activity associated with the device when the speech signal is received by the microphone at the second time; select, based on the second signal-to-noise ratio and the second activity, a second spectral mask to be applied to the second STFT signal, wherein the second selected spectral mask is indicative of a ratio of speech signals and second noise in the STFT domain; apply the second selected spectral mask to the second STFT signal to generate a second clean STFT signal; and apply a second inverse STFT to the second clean STFT signal to generate a clean speech signal.

Example 3 may include the apparatus of example 1 and/or some other example herein, wherein the processing circuitry is further configured to: determine that the signal-to-noise ratio is within a signal-to-noise ratio range; and determine that the signal-to-noise ratio range maps to the selected spectral mask, wherein to select the spectral mask to be applied to the STFT signal is further based on the determination that the signal-to-noise ratio range maps to the selected spectral mask.

Example 4 may include the apparatus of example 3 and/or some other example herein, wherein the processing circuitry is further configured to: train a machine learning model to determine that the signal-to-noise ratio range maps to the selected spectral mask, wherein to determine that the signal-to-noise ratio range maps to the selected spectral mask is based on using the trained machine learning model.

Example 5 may include the apparatus of example 1 and/or some other example herein, wherein the clean radio frequency signal is sent to the radio frequency circuitry while a second radio frequency signal received from the radio frequency circuitry is identified.

Example 6 may include the apparatus of any of examples 1-5 and/or some other example herein, wherein the radio frequency signal is an 802.11 Wi-Fi signal, and wherein the radio circuitry device is 802.11 Wi-Fi circuitry.

Example 7 may include the apparatus of example 1 and/or some other example herein, wherein the processing circuitry is further configured to: generate maps between spectral masks and signal-to-noise ratios, the spectral masks comprising the selected spectral mask; and store the maps with an indication of corresponding signal-to-noise ratios, activities associated with the device, and packet-error-rates, the activities comprising the activity, and the packet-error-rates comprising the packet-error-rate, and wherein to select the spectral mask to be applied to the STFT signal is based on the maps and comparisons of the packet-error-rate to the packet-error-rates, the activity to the activities, and the signal-to-noise ratio to the signal-to-noise ratios.

Example 8 may include the apparatus of example 1 and/or some other example herein, wherein the processing circuitry is further configured to: detect a change to at least one of the signal-to-noise ratio or the packet-error-rate; and select, based on the detected change, a second spectral mask to be applied to the STFT signal, wherein to apply the selected spectral mask to the STFT signal comprises to apply the second spectral mask to the STFT signal.

Example 9 may include a non-transitory computer-readable storage medium comprising instructions to cause processing circuitry of a device for reducing noise in and improving speech signals and radio signals, upon execution of the instructions by the processing circuitry, to: identify a multiplexed radio frequency signal received by radio frequency circuitry of the device at a time; apply a Short Time Fourier Transform (STFT) to the multiplexed radio frequency signal to generate a STFT signal in a STFT domain; identify a signal-to-noise ratio associated with the multiplexed radio frequency signal at the time; identify a packet-error-rate associated with the multiplexed radio frequency signal at the time; identify activity associated with the device when the multiplexed radio frequency signal is received by the radio frequency circuitry at the time; select, based on the signal-to-noise ratio, the packet-error-rate, and the activity, a spectral mask to be applied to the STFT signal, wherein the selected spectral mask is indicative of a ratio of radio frequency signals and noise in the STFT domain; apply the selected spectral mask to the STFT signal to generate a clean STFT signal; apply an inverse STFT to the clean STFT signal to generate a clean radio frequency signal; and send the clean radio frequency signal to the radio frequency circuitry prior to the multiplexed radio frequency signal being de-multiplexed by the radio frequency circuitry.

Example 10 may include the non-transitory computer-readable medium of example 9 and/or some other example herein, wherein execution of the instructions further causes the processing circuitry to: identify a speech signal received by a microphone of the device at a second time; apply a second STFT to the speech signal to generate a second STFT signal in the STFT domain; identify a second signal-to-noise ratio associated with the speech signal at the second time; identify second activity associated with the device when the speech signal is received by the microphone at the second time; select, based on the second signal-to-noise ratio and the second activity, a second spectral mask to be applied to the second STFT signal, wherein the second selected spectral mask is indicative of a ratio of speech signals and second noise in the STFT domain; apply the second selected spectral mask to the second STFT signal to generate a second clean STFT signal; and apply a second inverse STFT to the second clean STFT signal to generate a clean speech signal.

Example 11 may include the non-transitory computer-readable medium of example 9 and/or some other example herein, wherein execution of the instructions further causes the processing circuitry to: determine that the signal-to-noise ratio is within a signal-to-noise ratio range; and determine that the signal-to-noise ratio range maps to the selected spectral mask, wherein to select the spectral mask to be applied to the STFT signal is further based on the determination that the signal-to-noise ratio range maps to the selected spectral mask.

Example 12 may include the non-transitory computer-readable medium of example 11 and/or some other example herein, wherein execution of the instructions further causes the processing circuitry to: train a machine learning model to determine that the signal-to-noise ratio range maps to the selected spectral mask, wherein to determine that the signal-to-noise ratio range maps to the selected spectral mask is based on using the trained machine learning model.

Example 13 may include the non-transitory computer-readable medium of example 9 and/or some other example herein, wherein the clean radio frequency signal is sent to the radio frequency circuitry while a second radio frequency signal received from the radio frequency circuitry is identified.

Example 14 may include the non-transitory computer-readable medium of examples 9-13 and/or some other example herein, wherein the radio frequency signal is an 802.11 Wi-Fi signal, and wherein the radio frequency circuitry is 802.11 Wi-Fi circuitry.

Example 15 may include the non-transitory computer-readable medium of example 9 and/or some other example herein, wherein execution of the instructions further causes the processing circuitry to: generate maps between spectral masks and signal-to-noise ratios, the spectral masks comprising the selected spectral mask; and store the maps with an indication of corresponding signal-to-noise ratios, activities associated with the device, and packet-error-rates, the activities comprising the activity, and the packet-error-rates comprising the packet-error-rate, and wherein to select the spectral mask to be applied to the STFT signal is based on the maps and comparisons of the packet-error-rate to the packet-error-rates, the activity to the activities, and the signal-to-noise ratio to the signal-to-noise ratios.

Example 16 may include the non-transitory computer-readable medium of example 9 and/or some other example herein, wherein execution of the instructions further causes the processing circuitry to: detect a change to at least one of the signal-to-noise ratio or the packet-error-rate; and select, based on the detected change, a second spectral mask to be applied to the STFT signal, wherein to apply the selected spectral mask to the STFT signal comprises to apply the second spectral mask to the STFT signal.

Example 17 may include a method for reducing noise in and improving speech signals and radio signals, the method comprising: identifying, by processing circuitry of a device, a multiplexed radio frequency signal received by radio frequency circuitry of the device at a time; applying, by the processing circuitry, a Short Time Fourier Transform (STFT) to the multiplexed radio frequency signal to generate a STFT signal in a STFT domain; identifying, by the processing circuitry, a signal-to-noise ratio associated with the multiplexed radio frequency signal at the time; identifying, by the processing circuitry, a packet-error-rate associated with the multiplexed radio frequency signal at the time; identifying, by the processing circuitry, activity associated with the device when the multiplexed radio frequency signal is received by the radio frequency circuitry at the time; selecting, by the processing circuitry, based on the signal-to-noise ratio, the packet-error-rate, and the activity, a spectral mask to be applied to the STFT signal, wherein the selected spectral mask is indicative of a ratio of radio frequency signals and noise in the STFT domain; applying, by the processing circuitry, the selected spectral mask to the STFT signal to generate a clean STFT signal; applying, by the processing circuitry, an inverse STFT to the clean STFT signal to generate a clean radio frequency signal; and sending, by the processing circuitry, the clean radio frequency signal to the radio frequency circuitry prior to the multiplexed radio frequency signal being de-multiplexed by the radio frequency circuitry.

Example 18 may include the method of example 17 and/or some other example herein, further comprising: identifying a speech signal received by a microphone of the device at a second time; applying a second STFT to the speech signal to generate a second STFT signal in the STFT domain; identifying a second signal-to-noise ratio associated with the speech signal at the second time; identifying second activity associated with the device when the speech signal is received by the microphone at the second time; selecting, based on the second signal-to-noise ratio and the second activity, a second spectral mask to be applied to the second STFT signal, wherein the second selected spectral mask is indicative of a ratio of speech signals and second noise in the STFT domain; applying the second selected spectral mask to the second STFT signal to generate a second clean STFT signal; and applying a second inverse STFT to the second clean STFT signal to generate a clean speech signal.

Example 19 may include the method of example 17 and/or some other example herein, wherein the processing circuitry is further configured to: determining that the signal-to-noise ratio is within a signal-to-noise ratio range; and determining that the signal-to-noise ratio range maps to the selected spectral mask, wherein selecting the spectral mask to be applied to the STFT signal is further based on the determination that the signal-to-noise ratio range maps to the selected spectral mask.

Example, 20 may include the method of example 19 and/or some other example herein, further comprising: training a machine learning model to determine that the signal-to-noise ratio range maps to the selected spectral mask, wherein determining that the signal-to-noise ratio range maps to the selected spectral mask is based on using the trained machine learning model.

Example 21 may include an apparatus comprising means for: identifying a multiplexed radio frequency signal received by radio frequency circuitry of a device at a time; applying a Short Time Fourier Transform (STFT) to the multiplexed radio frequency signal to generate a STFT signal in a STFT domain; identify a signal-to-noise ratio associated with the multiplexed radio frequency signal at the time; identifying a packet-error-rate associated with the multiplexed radio frequency signal at the time; identifying activity associated with the device when the multiplexed radio frequency signal is received by the radio frequency circuitry at the time; selecting, based on the signal-to-noise ratio, the packet-error-rate, and the activity, a spectral mask to be applied to the STFT signal, wherein the selected spectral mask is indicative of a ratio of radio frequency signals and noise in the STFT domain; applying the selected spectral mask to the STFT signal to generate a clean STFT signal; applying an inverse STFT to the clean STFT signal to generate a clean radio frequency signal; and sending the clean radio frequency signal to the radio frequency circuitry prior to the multiplexed radio frequency signal being de-multiplexed by the radio frequency circuitry.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus for reducing noise in and improving speech signals and radio signals, the apparatus comprising processing circuitry coupled to memory, the processing circuitry configured to:

identify a multiplexed radio frequency signal received by radio frequency circuitry of a device comprising the apparatus at a time;

apply a Short Time Fourier Transform (STFT) to the multiplexed radio frequency signal to generate a STFT signal in a STFT domain;

identify a signal-to-noise ratio associated with the multiplexed radio frequency signal at the time;

identify a packet-error-rate associated with the multiplexed radio frequency signal at the time;

identify activity associated with the device when the multiplexed radio frequency signal is received by the radio frequency circuitry at the time;

select, based on the signal-to-noise ratio, the packet-error-rate, and the activity, a spectral mask to be applied to the STFT signal, wherein the selected spectral mask is indicative of a ratio of radio frequency signals and noise in the STFT domain;

apply the selected spectral mask to the STFT signal to generate a clean STFT signal;

apply an inverse STFT to the clean STFT signal to generate a clean radio frequency signal; and send the clean radio frequency signal to the radio frequency circuitry prior to the multiplexed radio frequency signal being de-multiplexed by the radio frequency circuitry.

2. The apparatus of claim 1, wherein the processing circuitry is further configured to:

identify a speech signal received by a microphone of the device at a second time;

apply a second STFT to the speech signal to generate a second STFT signal in the STFT domain;

identify a second signal-to-noise ratio associated with the speech signal at the second time;

identify second activity associated with the device when the speech signal is received by the microphone at the second time;

select, based on the second signal-to-noise ratio and the second activity, a second spectral mask to be applied to the second STFT signal, wherein the second selected spectral mask is indicative of a ratio of speech signals and second noise in the STFT domain;

apply the second selected spectral mask to the second STFT signal to generate a second clean STFT signal; and apply a second inverse STFT to the second clean STFT signal to generate a clean speech signal.

3. The apparatus of claim 1, wherein the processing circuitry is further configured to:

determine that the signal-to-noise ratio is within a signal-to-noise ratio range; and determine that the signal-to-noise ratio range maps to the selected spectral mask, wherein to select the spectral mask to be applied to the STFT signal is further based on the determination that the signal-to-noise ratio range maps to the selected spectral mask.

4. The apparatus of claim 3, wherein the processing circuitry is further configured to:

train a machine learning model to determine that the signal-to-noise ratio range maps to the selected spectral mask, wherein to determine that the signal-to-noise ratio range maps to the selected spectral mask is based on using the trained machine learning model.

5. The apparatus of claim 1, wherein the clean radio frequency signal is sent to the radio frequency circuitry while a second radio frequency signal received from the radio frequency circuitry is identified.

6. The apparatus of claim 1, wherein the radio frequency signal is an 802.11 Wi-Fi signal, and wherein the radio circuitry device is 802.11 Wi-Fi circuitry.

7. The apparatus of claim 1, wherein the processing circuitry is further configured to:

generate maps between spectral masks and signal-to-noise ratios, the spectral masks comprising the selected spectral mask; and store the maps with an indication of corresponding signal-to-noise ratios, activities associated with the device, and packet-error-rates, the activities comprising the activity, and the packet-error-rates comprising the packet-error-rate, and wherein to select the spectral mask to be applied to the STFT signal is based on the maps and comparisons of the packet-error-rate to the packet-error-rates, the activity to the activities, and the signal-to-noise ratio to the signal-to-noise ratios.

8. The apparatus of claim 1, wherein the processing circuitry is further configured to:

detect a change to at least one of the signal-to-noise ratio or the packet-error-rate; and select, based on the detected change, a second spectral mask to be applied to the STFT signal, wherein to apply the selected spectral mask to the STFT signal comprises to apply the second spectral mask to the STFT signal.

9. A non-transitory computer-readable storage medium comprising instructions to cause processing circuitry of a device for reducing noise in and improving speech signals and radio signals, upon execution of the instructions by the processing circuitry, to:

identify a multiplexed radio frequency signal received by radio frequency circuitry of the device at a time;

apply a Short Time Fourier Transform (STFT) to the multiplexed radio frequency signal to generate a STFT signal in a STFT domain;

identify a signal-to-noise ratio associated with the multiplexed radio frequency signal at the time;

identify a packet-error-rate associated with the multiplexed radio frequency signal at the time;

identify activity associated with the device when the multiplexed radio frequency signal is received by the radio frequency circuitry at the time;

select, based on the signal-to-noise ratio, the packet-error-rate, and the activity, a spectral mask to be applied to the STFT signal, wherein the selected spectral mask is indicative of a ratio of radio frequency signals and noise in the STFT domain;

apply the selected spectral mask to the STFT signal to generate a clean STFT signal;

apply an inverse STFT to the clean STFT signal to generate a clean radio frequency signal; and send the clean radio frequency signal to the radio frequency circuitry prior to the multiplexed radio frequency signal being de-multiplexed by the radio frequency circuitry.

10. The non-transitory computer-readable medium of claim 9, wherein execution of the instructions further causes the processing circuitry to:

identify a speech signal received by a microphone of the device at a second time;

apply a second STFT to the speech signal to generate a second STFT signal in the STFT domain;

identify a second signal-to-noise ratio associated with the speech signal at the second time;

identify second activity associated with the device when the speech signal is received by the microphone at the second time;

select, based on the second signal-to-noise ratio and the second activity, a second spectral mask to be applied to the second STFT signal, wherein the second selected spectral mask is indicative of a ratio of speech signals and second noise in the STFT domain;

apply the second selected spectral mask to the second STFT signal to generate a second clean STFT signal; and apply a second inverse STFT to the second clean STFT signal to generate a clean speech signal.

11. The non-transitory computer-readable medium of claim 9, wherein execution of the instructions further causes the processing circuitry to:

determine that the signal-to-noise ratio is within a signal-to-noise ratio range; and determine that the signal-to-noise ratio range maps to the selected spectral mask, wherein to select the spectral mask to be applied to the STFT signal is further based on the determination that the signal-to-noise ratio range maps to the selected spectral mask.

12. The computer-readable medium of claim 11, wherein execution of the instructions further causes the processing circuitry to:

train a machine learning model to determine that the signal-to-noise ratio range maps to the selected spectral mask, wherein to determine that the signal-to-noise ratio range maps to the selected spectral mask is based on using the trained machine learning model.

13. The non-transitory computer-readable medium of claim 9, wherein the clean radio frequency signal is sent to the radio frequency circuitry while a second radio frequency signal received from the radio frequency circuitry is identified.

14. The non-transitory computer-readable medium of claim 9, wherein the radio frequency signal is an 802.11 Wi-Fi signal, and wherein the radio frequency circuitry is 802.11 Wi-Fi circuitry.

15. The non-transitory computer-readable medium of claim 9, wherein execution of the instructions further causes the processing circuitry to:

generate maps between spectral masks and signal-to-noise ratios, the spectral masks comprising the selected spectral mask; and store the maps with an indication of corresponding signal-to-noise ratios, activities associated with the device, and packet-error-rates, the activities comprising the activity, and the packet-error-rates comprising the packet-error-rate, and wherein to select the spectral mask to be applied to the STFT signal is based on the maps and comparisons of the packet-error-rate to the packet-error-rates, the activity to the activities, and the signal-to-noise ratio to the signal-to-noise ratios.

16. The non-transitory computer-readable medium of claim 9, wherein execution of the instructions further causes the processing circuitry to:

detect a change to at least one of the signal-to-noise ratio or the packet-error-rate; and select, based on the detected change, a second spectral mask to be applied to the STFT signal, wherein to apply the selected spectral mask to the STFT signal comprises to apply the second spectral mask to the STFT signal.

17. A method for reducing noise in and improving speech signals and radio signals, the method comprising:

identifying, by processing circuitry of a device, a multiplexed radio frequency signal received by radio frequency circuitry of the device at a time;

applying, by the processing circuitry, a Short Time Fourier Transform (STFT) to the multiplexed radio frequency signal to generate a STFT signal in a STFT domain;

identifying, by the processing circuitry, a signal-to-noise ratio associated with the multiplexed radio frequency signal at the time;

identifying, by the processing circuitry, a packet-error-rate associated with the multiplexed radio frequency signal at the time;

identifying, by the processing circuitry, activity associated with the device when the multiplexed radio frequency signal is received by the radio frequency circuitry at the time;

selecting, by the processing circuitry, based on the signal-to-noise ratio, the packet-error-rate, and the activity, a spectral mask to be applied to the STFT signal, wherein the selected spectral mask is indicative of a ratio of radio frequency signals and noise in the STFT domain;

applying, by the processing circuitry, the selected spectral mask to the STFT signal to generate a clean STFT signal;

applying, by the processing circuitry, an inverse STFT to the clean STFT signal to generate a clean radio frequency signal; and sending, by the processing circuitry, the clean radio frequency signal to the radio frequency circuitry prior to the multiplexed radio frequency signal being de-multiplexed by the radio frequency circuitry.

18. The method of claim 17, further comprising:

identifying a speech signal received by a microphone of the device at a second time;

applying a second STFT to the speech signal to generate a second STFT signal in the STFT domain;

identifying a second signal-to-noise ratio associated with the speech signal at the second time;

identifying second activity associated with the device when the speech signal is received by the microphone at the second time;

selecting, based on the second signal-to-noise ratio and the second activity, a second spectral mask to be applied to the second STFT signal, wherein the second selected spectral mask is indicative of a ratio of speech signals and second noise in the STFT domain;

applying the second selected spectral mask to the second STFT signal to generate a second clean STFT signal; and applying a second inverse STFT to the second clean STFT signal to generate a clean speech signal.

19. The method of claim 17, wherein the processing circuitry is further configured to:

determining that the signal-to-noise ratio is within a signal-to-noise ratio range; and determining that the signal-to-noise ratio range maps to the selected spectral mask, wherein selecting the spectral mask to be applied to the STFT signal is further based on the determination that the signal-to-noise ratio range maps to the selected spectral mask.

20. The method of claim 19, further comprising:

training a machine learning model to determine that the signal-to-noise ratio range maps to the selected spectral mask, wherein determining that the signal-to-noise ratio range maps to the selected spectral mask is based on using the trained machine learning model.

* * * * *